J. H. MACLEARY & S. O. LYNN.
PEANUT PICKER.
APPLICATION FILED AUG. 21, 1915.
1,216,149.
Patented Feb. 13, 1917.
5 SHEETS—SHEET 1.
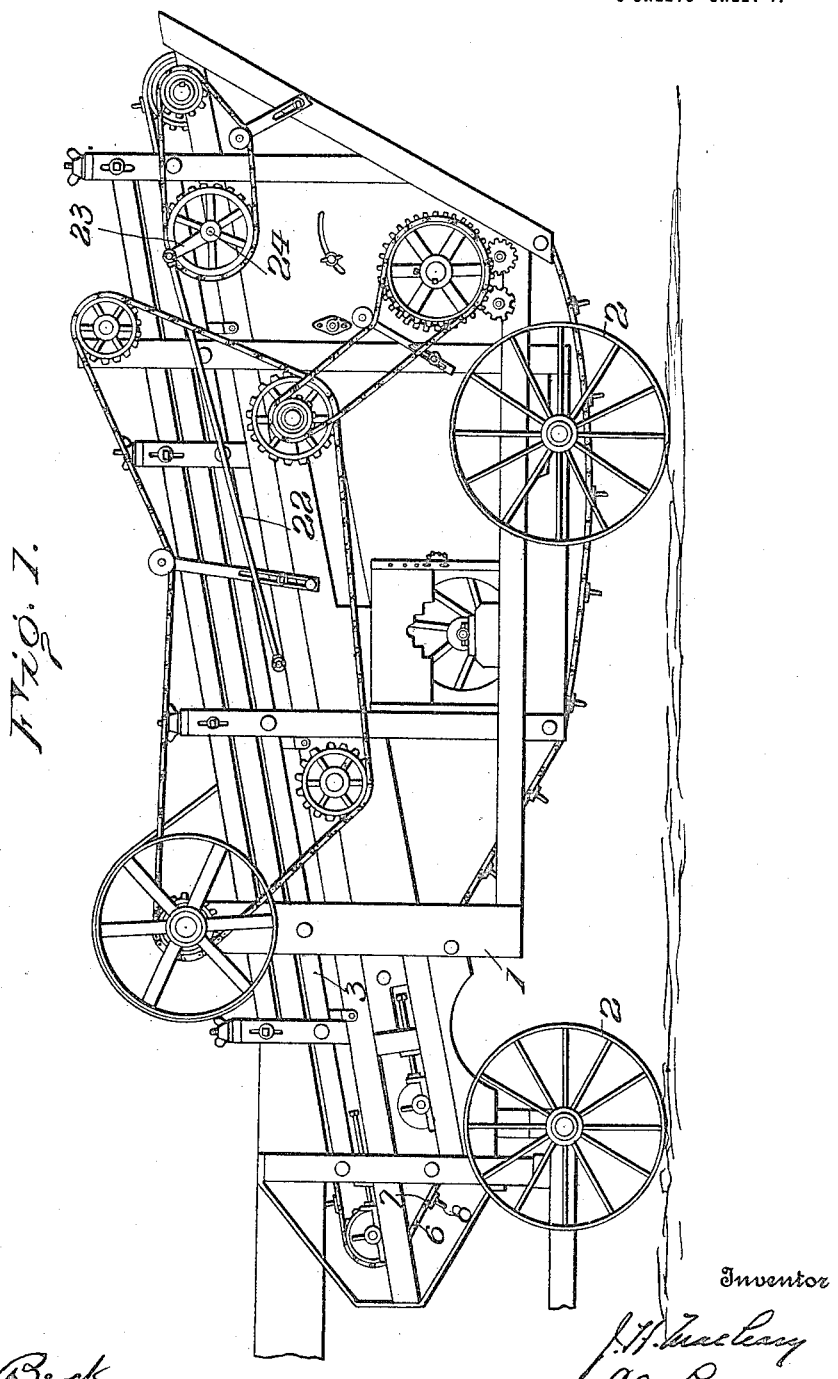

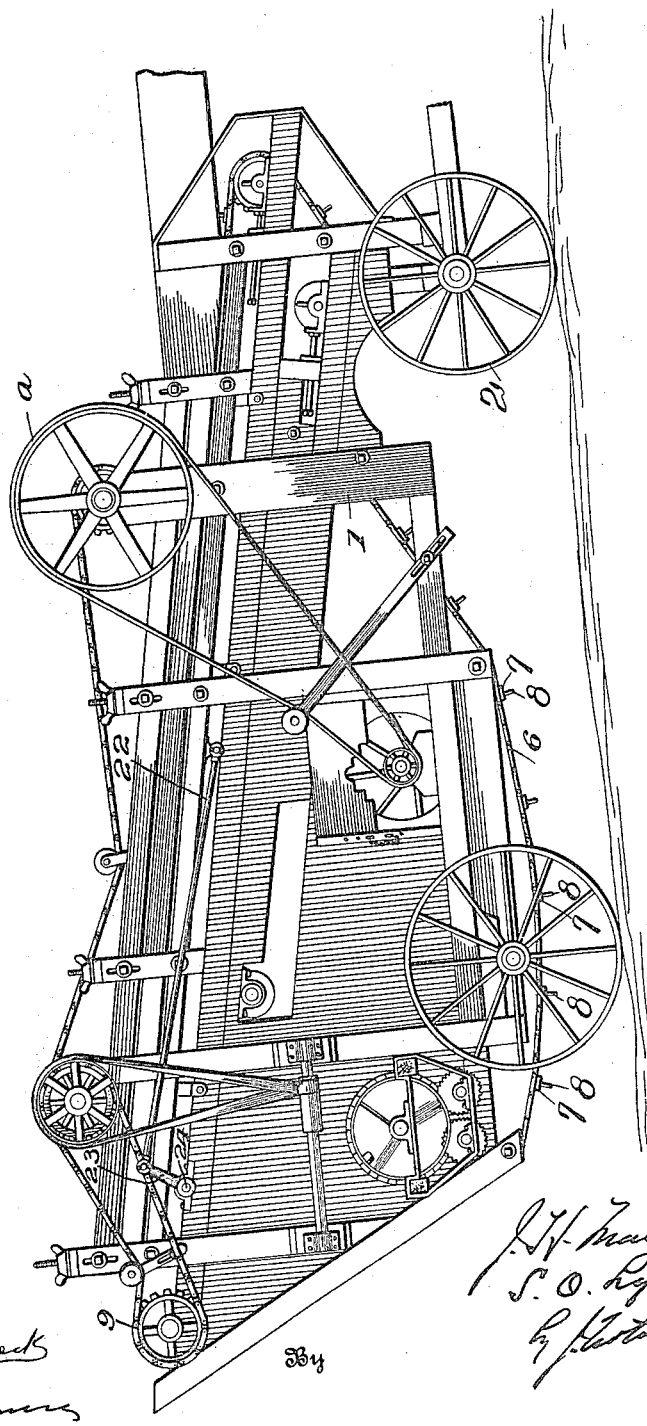

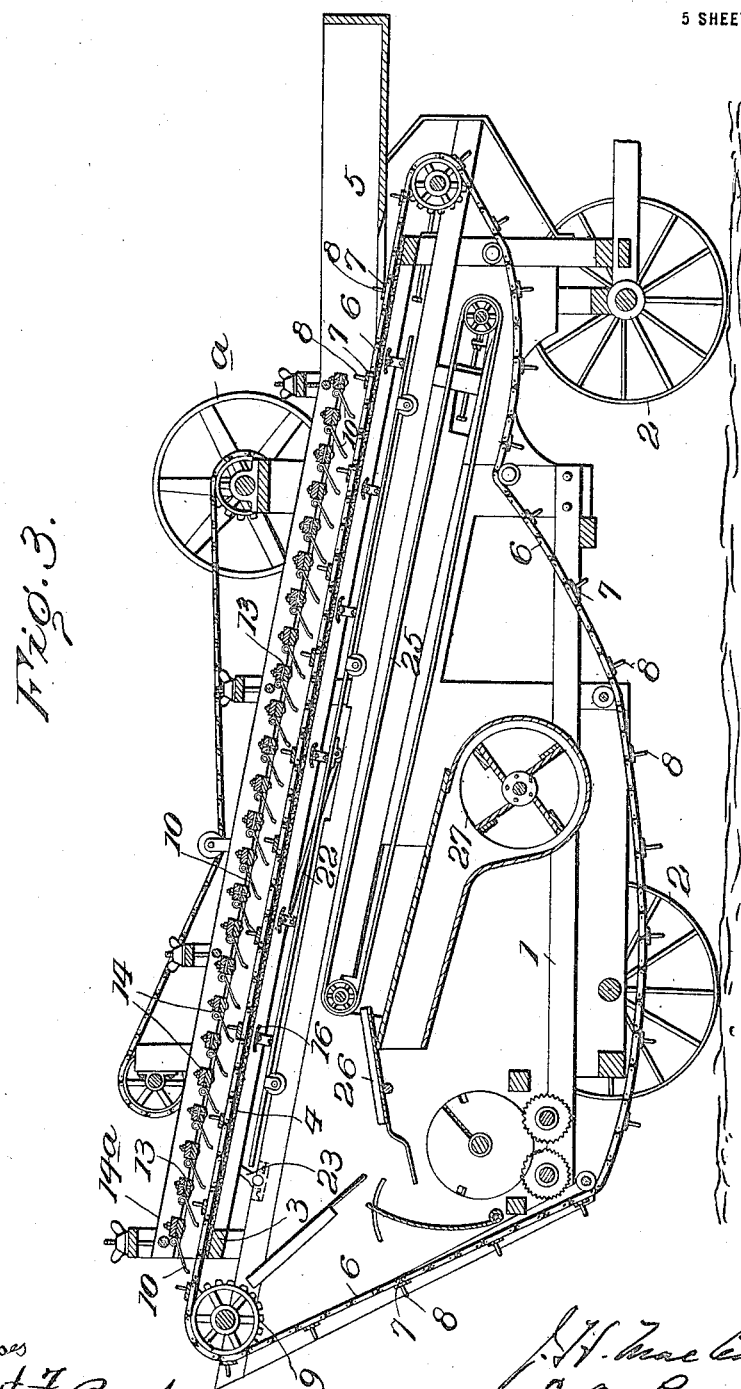

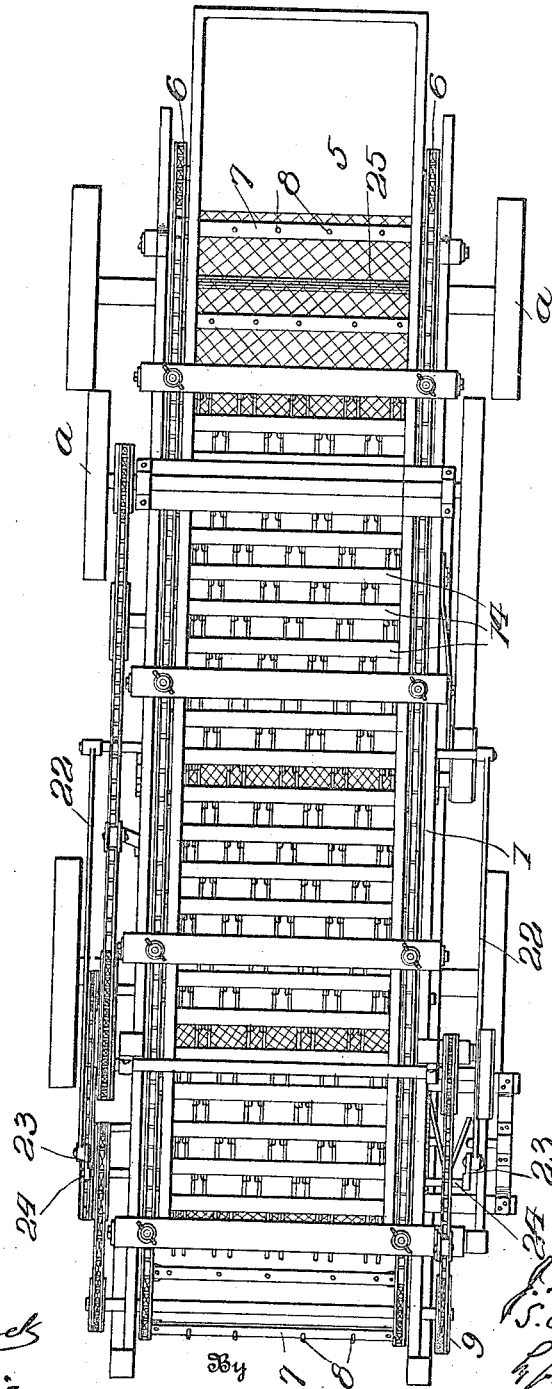

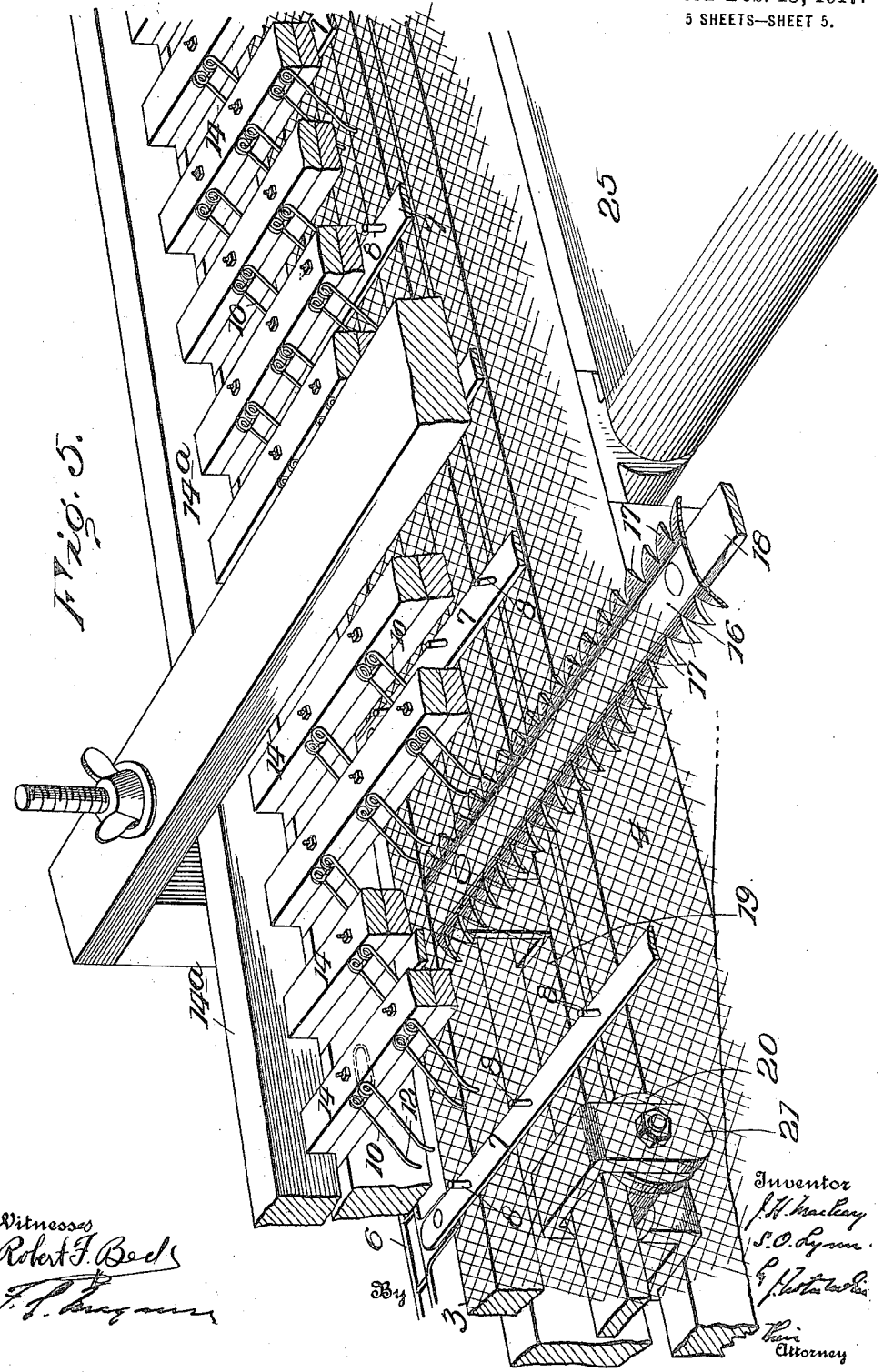

UNITED STATES PATENT OFFICE.

JOSEPH HENRY MACLEARY AND SIDNEY OVID LYNN, OF SUFFOLK, VIRGINIA.

PEANUT-PICKER.

1,216,149.   Specification of Letters Patent.   Patented Feb. 13, 1917.

Application filed August 21, 1915. Serial No. 46,682.

*To all whom it may concern:*

Be it known that we, JOSEPH H. MACLEARY and SIDNEY O. LYNN, of Suffolk, in the county of Nansemond and State of Virginia, have invented certain new and useful Improvements in Peanut-Pickers; and we do hereby declare the following to be a full, clear, and exact description of the invention, such as will enable others skilled in the art to which it appertains to make and use the same.

This invention relates to peanut pickers wherein the vines with the nuts thereon are placed on a receiving table and fed therefrom to and over a picking table by means of an endless conveyer.

In known machines of this character, difficulty has heretofore been experienced in stripping the nuts from vines that are damp or wet, the mechanism employed having a tendency to force the peanuts back through the meshes of the picking table, requiring a further passage of the vines over the table and consequently interfering with the capacity of the machine. Trouble has also been experienced because the wet vines frequently clogged the table and required that the machine be stopped to free the parts.

The object of our invention is to provide an improved machine which will obviate these difficulties, simple and efficient means being provided for picking the peanuts from vines whether dry or wet and keeping the picking table free of all debris.

In the accompanying drawings, Figures 1 and 2 are views in side elevation from opposite sides of the picking machine. Fig. 3 is a sectional view in side elevation. Fig. 4 is a top plan view. Fig. 5 is an enlarged view in perspective showing a portion of the picking table and the picking combs.

Referring to the drawings, 1 designates the frame of a picking machine suitably mounted on carrying wheels 2. The picking table is supported in the frame work of the machine and extends throughout the greater portion of the length thereof. It comprises a skeleton frame 3 upon which is stretched a meshed wire screen 4 over which the vines with the peanuts thereon are designed to pass. The picking table may readily be replaced with one of larger or smaller mesh to accommodate nuts of different sizes.

Vines are fed to the machine from a table 5 from which they are gathered and carried over the picking table by an endless conveyer 6 comprising side chains, spanned by cross bars 7 having upwardly projecting vine engaging fingers 8, the chains being driven by sprockets 9 which receive power from a prime mover A. In order that the vines may be held in close contact with the table to cause the peanuts to drop through the screen, we provide spring fingers 10 spaced across the table in rows, the fingers of alternate rows being staggered in relation to each other so as to be effectively spread over the vines. Each finger is formed from a single piece of wire bent to form two downwardly extending spring prongs 12 and a horizontal portion 13 which is clamped between cross bars 14 secured to side members 14ª of the frame, these members being vertically adjustable to raise or lower the fingers relatively to the table.

16 designates a series of reciprocating picking combs arranged beneath the picking table and close thereto. Each comb is preferably formed of a single piece of sheet steel and has a series of saw like teeth 17 along each longitudinal edge. The nuts extending through the screen will be caught between the teeth of the combs and stripped from the vines as the combs are reciprocated. The comb teeth are bent slightly downward to prevent interference with the screen of the picking table. The combs are riveted or otherwise secured to cross bars 18 the ends of which are bent downwardly at right angles thereto and then horizontally to form a connection with longitudinally arranged guiding rails 19. The bars 18 and rails 19 form a supporting frame for the combs. Rails 19 are supported by grooved rollers 20 upon which they are designed to reciprocate, the rollers being journaled in brackets 21 of the picker frame. The combs are reciprocated by means of two pitman rods 22, located on each side of the machine. Each pitman rod is secured to one of the guiding rails 19 about midway the length of the rail, the other end being connected by a crank 23 to a shaft 24 driven by sprocket and chain connection in gear with the driving means for the conveyer 6.

25 is an endless conveyer driven by suitable gearing and arranged beneath the picking table. This conveyer carries the nuts and such portions of the vine as may have been pulled through the table by the picking combs to a separator 26 over which the nuts and chaff are fed, the chaff being separated from the nuts by a blower 27 and the nuts dropped through fingers of the separator to the hopper of a stemming attachment of the type shown and described in Letters Patent No. 1,083,844, granted to Joseph H. Macleary and H. D. E. Little, on January 6, 1914.

In practice the vines with the peanuts adhering thereto are placed on the receiving table 5 from which they are gathered by conveyers 6 and drawn over the table, and beneath the fingers 10. These fingers act to hold the vines close to the table so that the nuts will drop through the screen. Some of the nuts will be stripped from the vines as the latter are pulled over the table, the nuts being caught in the diamond shaped meshes of the screen, but a majority will be wedged between the saw-teeth of the picking combs and stripped from the vines as the combs are reciprocated beneath the table. Each comb is so arranged as to slightly overlap the path of its next adjacent comb. In this way the entire area of the table is swept by the reciprocal action of the combs, insuring a positive engagement of all nuts, some being picked in the forward movement and others in the reverse movement of the combs. The latter are arranged close to the table so that any portions of the vine on the fingers or any nuts which may be tightly wedged between the fingers will be freed in the relatively reverse movement of the comb by striking against the table. It will be seen that the combs are thus self-cleaning and consequently at all times free of any clogging particles. In addition, the combs will pull any hanging portions of the vines through the screen and thus keep the screen clean. The nuts and debris will fall onto the conveyer 25 and be carried to the separator where the chaff will be blown from the machine in a known manner and the nuts fed to the hopper of the stemmer.

We claim as our invention:

1. In a machine for picking nuts from vines, a picking table, a conveyer in operative relation to said table, means for holding the vines on said table, a longitudinally reciprocating frame beneath said table, and a series of picking combs on said frame, each of said combs having a double working edge.

2. In a machine for picking nuts from vines, a picking table, a conveyer in operative relation to said table, means for holding the vines on said table, a longitudinally reciprocating frame beneath said table, and a series of transversely arranged double edged picking combs on said frame.

3. In a machine for picking nuts from vines, a picking table for said vines, spring fingers for holding the vines to said table, a conveyer in operative relation to said table, a longitudinally reciprocating frame, and a series of spaced apart picking members subjacent said table and supported by said frame, said members having teeth along their longitudinal edges.

4. In a machine for picking nuts from vines, a stationary picking screen, a conveyer in operative relation to said screen, spring fingers for holding the vines against said screen, a longitudinally movable frame of less length than said screen, transversely arranged spaced apart double edged picking combs on said frame, and means for moving said frame to cause said combs to travel in overlapping paths.

5. In a machine for picking nuts from vines, a stationary picking screen, a conveyer in operatve relation to said screen, spring fingers for holding the vines against said screen, a series of picking combs beneath said screen, each of said combs having a double working edge, a longitudinally movable frame on which said combs are mounted, bearings for said frame, and means for reciprocating the latter.

6. In a machine for picking nuts from vines, a stationary picking screen, a conveyer in operative relation to said screen, spring fingers for holding the vines against said screen, picking means beneath said screen comprising a longitudinally reciprocating frame having guide rails and spaced apart transversely arranged picking members connecting said rails, each of said picking members having teeth along its longitudinal edges, and supports for said guide rails.

In testimony whereof, we have signed this specification in the presence of two subscribing witnesses.

JOSEPH HENRY MACLEARY.
SIDNEY OVID LYNN.

Witnesses:
J. C. MOORE,
HOWARD T. WRIGHT.

Copies of this patent may be obtained for five cents each, by addressing the "Commissioner of Patents, Washington, D. C."